United States Patent [19]
Gohl et al.

[11] Patent Number: 5,062,072
[45] Date of Patent: Oct. 29, 1991

[54] INPUT MANAGEMENT CIRCUIT PARTICULARLY FOR A PROGRAMMABLE AUTOMATION

[75] Inventors: Pierre Gohl, La Colle Sur Loup; Jean-Louis Lachenal, Valbonne; Jacky Pergent, Carros Le Neuf, all of France

[73] Assignee: La Telemecanique Electrique, France

[21] Appl. No.: 530,481

[22] Filed: Jun. 1, 1990

Related U.S. Application Data

[63] Continuation of Ser. No. 125,663, Nov. 25, 1987, abandoned.

[30] Foreign Application Priority Data

Nov. 25, 1986 [FR] France .................. 86 16855

[51] Int. Cl.⁵ .................................................. G06F 13/00
[52] U.S. Cl. .................................... 364/900; 364/926.9; 364/935.44; 364/949

[58] Field of Search ... 364/200 MS File, 900 MS File, 364/138–141

[56] References Cited

U.S. PATENT DOCUMENTS

| | | | |
|---|---|---|---|
| 3,942,158 | 3/1976 | Dummermuth | 364/900 |
| 4,104,731 | 8/1978 | Grudowski et al. | 364/900 |
| 4,910,659 | 3/1990 | Gates et al. | 364/140 |

Primary Examiner—Gareth D. Shaw
Assistant Examiner—Paul Kulik
Attorney, Agent, or Firm—William A. Drucker

[57] ABSTRACT

An input or input-output management circuit for a process control system such as a programmable automation is provided, including a serializing means with parallel inputs connected to input channels by filtering and threshold means, a series output of the serializing means being connected via a series connection equipped with an optocoupler and a filter to an input or input-output management unit.

18 Claims, 4 Drawing Sheets

INPUT MANAGEMENT CIRCUIT PARTICULARLY FOR A PROGRAMMABLE AUTOMATION

This application is a continuation of application Ser. No. 07/125,663, filed Nov. 25, 1987, now abandoned.

BACKGROUND OF THE INVENTION

The present invention relates to an input, or as the case may be input-output management circuit for a process control system in an industrial or tertiary sphere such as a programmable automaton.

As is known, programmable automata include input and output circuits managed by a central processing unit including a processor and associated memories, particularly an input-output image memory as well as a data bus providing a connection between the input and output circuits and the central unit; in particular, the input circuits include a plurality of parallel input channels able to be connected to respective sensors, the state of the input channels being cyclically scrutinzed by the central unit.

The input circuit include components interconnected together and fixed to a card whose surface must be as small as possible; in addition, the input circuits are directly subjected to parasites and noise affecting the terminals and conductors connecting with the sensors.

Generally in the input circuit optocouplers are used associated with input channels so as to provide isolated transmission of the signals coming from the sensors. There exists one optocoupler per input channel and the optocouplers therefore occupy considerable space on the input card. Furthermore, different drawbacks result from the use of optocouplers: their phototransistor in fact risks being saturated should a violent disturbance occur due to a common mode parasite; furthermore, the dispersion and lack of fidelity in the characteristics of optocouplers mean that the disabled time thereof is badly known and furthermore varies in time.

The purpose of the invention is to overcome these drawbacks due to the use of optocouplers for each of the input channels without adversely affecting the behavior of the process control system to disturbances, and this by means of a compact input architecture with good performances as far as the safety of acquisition of the input signals is concerned.

The invention also makes it possible to check the voltage of the sensors in a simple way.

SUMMARY OF THE INVENTION

In accordance with the invention, in a process control system such as a programmable automaton or similar system an input—or if required input-output—management circuit is provided including:

a serializer means with parallel inputs connected to the respective input channels by respective filtering and threshold members and having a series output able to transmit words including successive bits corresponding to the signals applied to the input channels, a series connection connecting said series output to an input—or if required input-output—management unit which may be coupled to the processor of the central unit for exchanges with the input-output image memory, an isolating member such as an optocoupler, interposed in a series connection for ensuring isolated transmission of the words between the serializing means and the input management unit, and a filter disposed in the series connection downstream of the optocoupler.

The result is a simplification of the interconnections and a small space requirement for the card carrying the input managment circuit since this card only includes—for a given assembly of input channels—a reduced number of optocouplers, namely a single data transmitting optocoupler and a few clock or address signal transmitting optocouplers Furthermore, the filtering carried out in each channel before the optocoupler makes it possible to transmit data signals rid of parasites.

Preferably, in addition to a parity bit, fixed value bits are incorporated in each word transmitted over the series connection for checking the integrity of this connection as well as a bit for checking the voltage of the sensors.

BRIEF DESCRIPTION OF THE DRAWINGS

Other features and advantages of the invention will be clear from the following description of one non limitative embodiment, with reference to the accompanying drawings.

DESCRIPTION OF THE PREFERRED EMBODIMENTS

Figure 1:
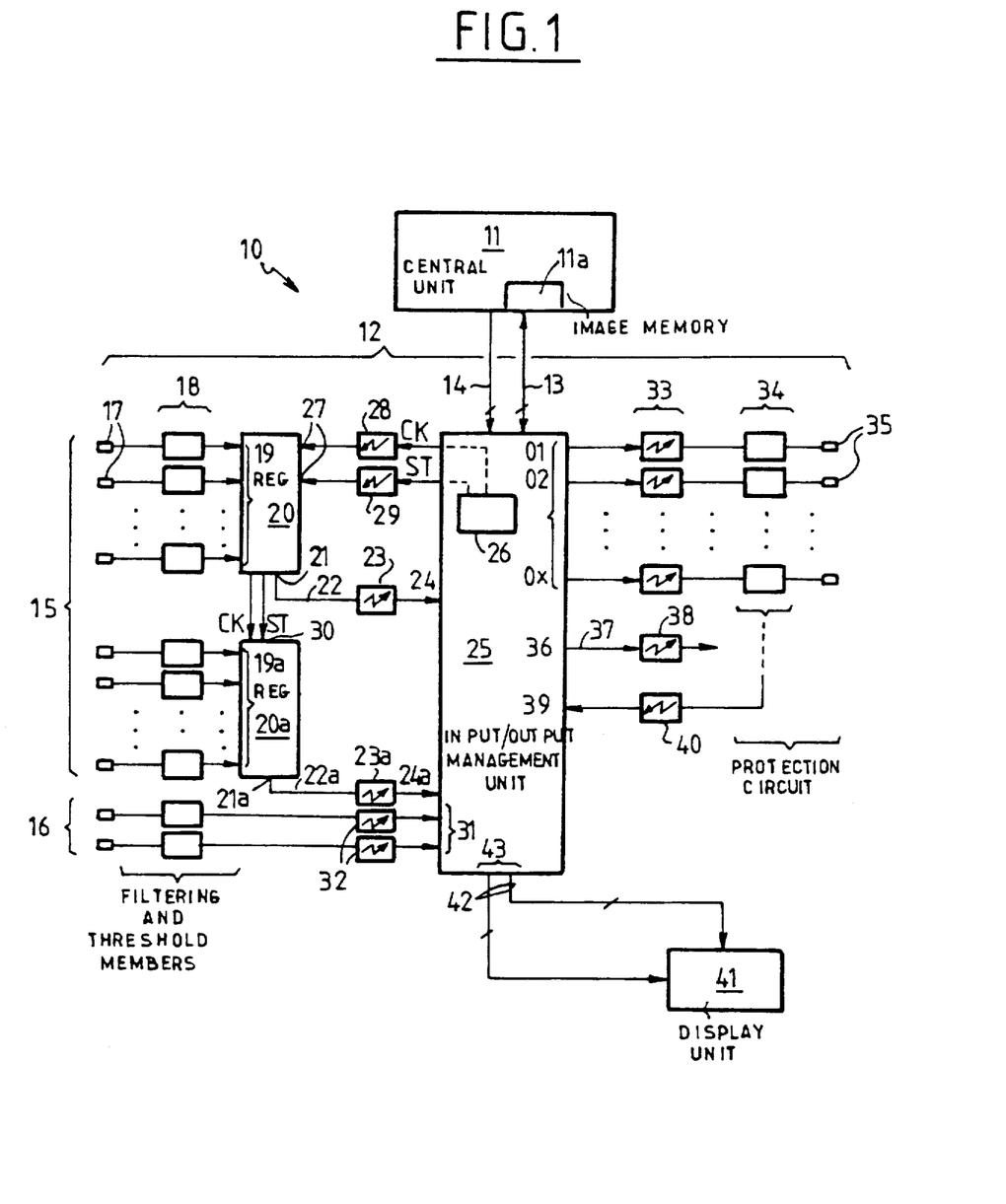
FIG. 1 shows a block diagram of an input-output management circuit for a programmable automat in accordance with the invention.

The programmable automaton 10 illustrated in FIG. 1 includes a central processing unit 11 formed of a microprocessor, a processing logic and associated memories, particularly an input-output image memory 11a. It also includes a power supply, not shown, and one or several input-output management circuits 12; such a circuit will now be described.

The central unit 11 is connected to one or more circuits 12 by a data bus 13, for example an 8 bit bus, and by a service signal bus 14.

Each input-output management circuit 12 includes a number of normal parallel input channels 15 and two parallel priority event input channels 16. Each input channel is able to be connected to a sensor via an input terminal 17 and has an analog filtering and threshold member 18.

Channels 15 are connected to the parallel inputs 19 of a serializing means 20. This latter is formed in the present embodiment by a parallel-series register. Another parallel-series register 20a is added for doubling the number of normal input channels. The input acquisition capacity may be further increased by adding other parallel-series registers.

The parallel-series register 20 has a series output 21 connected, through a series connection 22 including an optocoupler 23 or another similar isolated transmission means, to the series input 24 of an input-output management unit 25 having a clock system 26 which is independent of the clock system of the central unit 11. The acquisition of inputs by registers 20 and 20a may thus be effected simultaneously and independently of the acquisition and processing rate of the central unit.

As will be seen in detail further on, the clock signal 26 delivers a number of signals, particularly a discontinuous clock signal CK and a scrutinizing signal ST. The signals CK and ST time respectively the bits and the words to be conveyed by the series connection 22. The signals CK and ST are transmitted from the management unit 25 to inputs 27 of the parallel-series register 20 via lines equipped with respective optocouplers 28, 29.

As a variant, the clock system 26 may deliver a continuous signal CK' for timing the bits of the series connection and a parallel/series signal P/S for determining the parallel loading or series sliding of register 20; the signals CK' and P/S being hereagain transmitted from unit 25 to register 20 over two lines equipped with respective optocouplers.

Like register 20, the parallel-series register 20a has, on the one hand, parallel inputs 19a connected to the channels 15 via analog filtering and threshold members 18 and, on the other hand, a series output 21a connected via a series connection 22a equipped with an optocoupler 23a to a second series input 24a of the management unit 25. Inputs 30 of register 20a receive the signals CK and ST indirectly via the register 20. It should be noted that, when the input management circuit of the invention includes several parallel-series registers 20, 20a, 20b, 20c, . . . , it is sufficient to provide as many series connection optocouplers 23 as there are registers, while making do with one or two clock and/or control optocouplers 28, 29.

The management unit 25 further includes parallel inputs 31 each connected via a filtering and threshold member 18 and an optocoupler 32 to the priority high speed inputs 16. Unit 25 further includes a number of parallel outputs O1-Ox connected by optocouplers 33 and respective protection circuits 34 to output terminals 35. A series output 36 timed by the signals CK and ST—or in a variant by CK' and P/S—is connected via a series connection 37 equipped with an optocoupler 38 to a self test device and/or to an appropriate user means.

As a variant, the parallel outputs O1-Ox may be omitted and the input-ouput management unit 25 may include a single series output connected via the optocoupler 38 to the series input of a deserializing means; the parallel outputs of this means are then connected to the output channels via the protection circuits 34, this arrangement being as it were similar to that of the serializing means 20.

One input 39 of unit 25 receives via an optocoupler 40 a fault signal when a fault occurs at one of the outputs and when this fault has been detected by one of the circuits 34. Moreover, a display unit 41 is connected by conductors 42 to multiplexed outputs 43 of the management unit 25.

Figure 2:
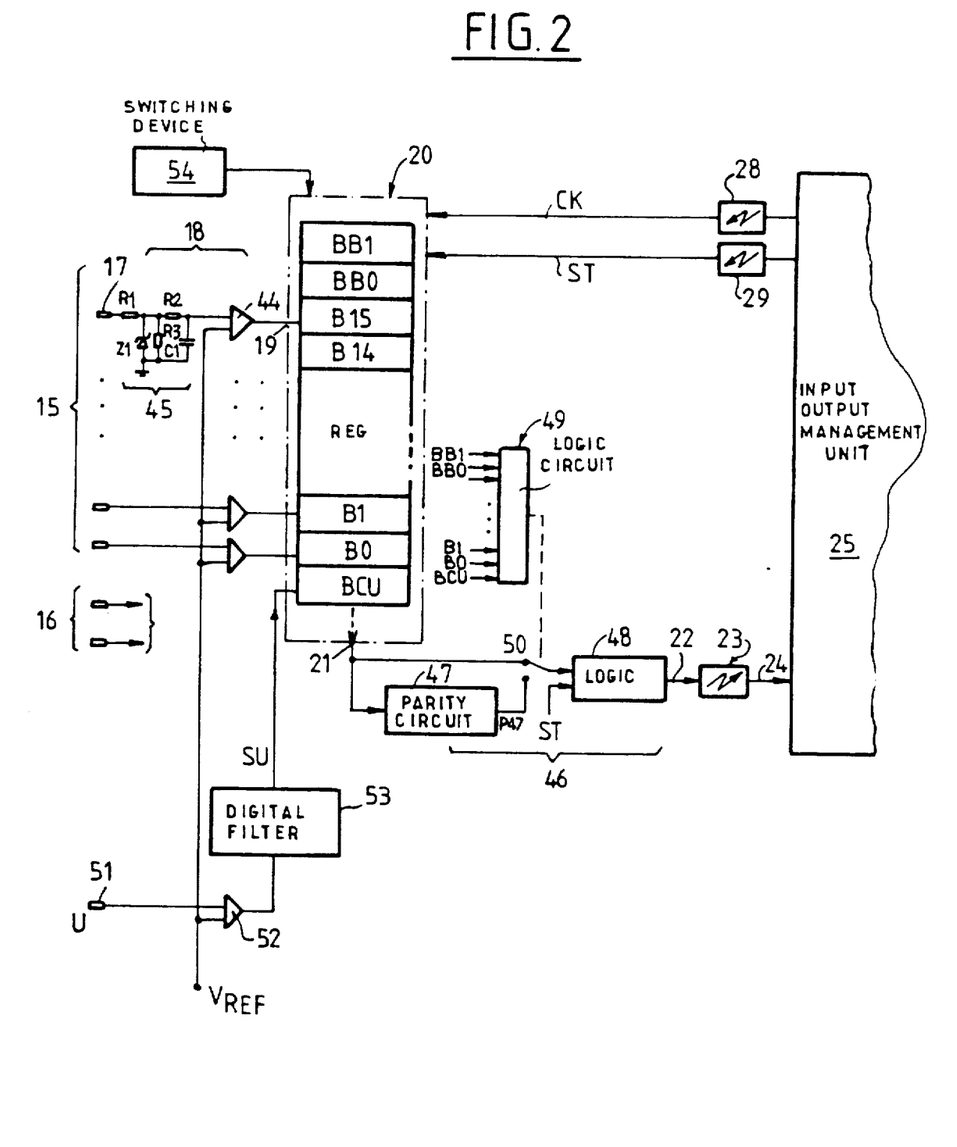
FIG. 2 is a partial diagram of a preferred embodiment of the input-output management circuit of FIG. 1.

In the embodiment shown in FIG. 2, the serializing means 20 include a shift register formed of 19 D flip flops, namely:

one flip flop BCU for checking the voltage U of the sensors, 16 data flip flops B0-B15 connected to the respective input terminals 17, and two exchange control flip flops BB0, BB1.

Flip flop BCU generates a bit of value 0 or 1 depending on whether the supply voltage of the sensors is less or greater than a voltage threshold VREF.

Flip flops B0-B15 generate a bit of value 0 or 1 depending on whether the voltage applied to the respective terminal 17 is less or greater than the same threshold VREF. It is advantageous for this threshold VREF to be the same, on the one hand, for checking the voltage U of the sensors and, on the other, for acquiring the data coming from these sensors, since thus any variation of threshold is taken into account in the same direction.

Flip flops BB0, BB1, are adapted to deliver a bit B0, B1 of fixed value, 0 and 1 respectively, for checking the physical integrity of the connection between the serializing means and the input-output management unit. Bits B0 and B1 make it possible more particularly to check whether the optocoupler connections 23, 23a, and 28, 29 introduce a transmission error so as to ensure in the case of failure an inhibition of the exchange and signalling of a fault; such a case of failure may, for example, be formed by a short circuit or an open circuit of an optocoupler.

Each data flip flop B0-Bn is connected to its respective terminal 17 via the filtering and threshold member 18, only the one of which associated with the flip flop B15 has been shown for the sake of simplicity.

Each member 18 includes a comparator 44 preceded by an analog filtering network 45. Network 45 has between terminal 17 and an input of the comparator two series resistors R1, R2; a point situated between R2 and the input of the comparator is connected to ground through a capacitor C1; an intermediate point between R1 and R2 is connected to ground via a resistor R3 in parallel with the Zener diode Z1. Another input of the comparator receives the threshold voltage VREF, with the advantage mentioned above.

The outputs of the different comparators 44 are connected to the parallel inputs 19 of register 20, whereas the series output 21 of the register is connected to a means 46 for elaborating a parity bit and adding it to the frame. Means 46 includes a parity calculating means 47 for each frame emitted by register 20. Member 47 delivers a parity bit P47 transmitted at the end of exchange to the series connection 22 via an appropriate logic 48 taking into account particularly the emission of the scrutinization signal ST. This end of exchange transmission takes place by means of a switch 50 depending on a logic 49. This latter receives at different inputs the output signals of flip flops BCU, B0-Bn, BB0, BB1 and controls the switch when these signals indicate the end of series sliding; switch 50 thus ensures, during exchange, the direct connection 21-48 and, at the end of exchange the connection 47-48.

Preferably, member 47 includes an exclusive OR gate with two inputs and a D type flip flop timed by signal CK and reset by signal ST. The data input of the D flip flop is connected to the output of the exclusive OR gate. The Q output of the D flip flop is connected, on the one hand, to switch 50 for connection to the series connection and, on the other hand, to a first input of the exclusive OR gate whereas a second input of this gate is connected to the output 21 of register 20. Thus a hit on the run parity calculation is obtained in a simple way.

The flip flop BCU for checking the voltage U at the sensors is connected to an input terminal 51 to which the voltage U is applicable by a comparator 52 and a digital filter 53. Comparator 52 compares the voltage U with a threshold VREF and the filter 53, which could in a variant be an analog filter, delivers a signal SU applied to flip flop BCU.

Advantageously, the digital filter 53 is an up-down counter designed so as to have:

for a cut off of the voltage U of the sensors, a time constant less than the time constant of the filtering networks 45 of members 18, and for reestablishing the voltage U of the sensors, a time constant greater than the time constant of the networks 45.

Thus it is certain that the sigal SU for checking the voltage of the sensors changes state, on the one hand, during a cut off of U more rapidly than the data signals and, on the other hand, during a rise of U less rapidly than the data signals so as to make possible charging of the capacitor C1 of the analog filters 45 of the input channels.

Figure 3:
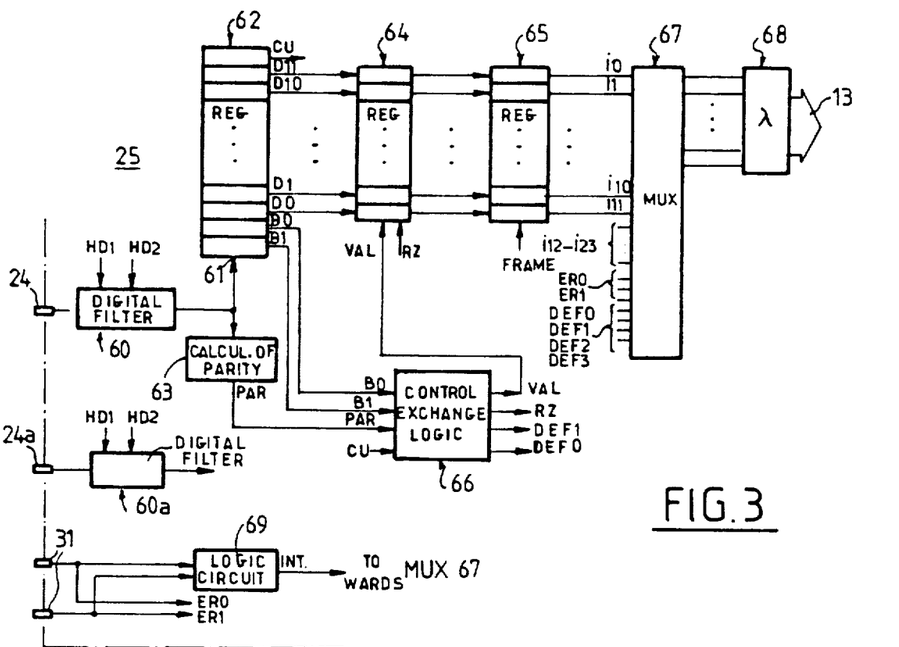
FIG. 3 is a block diagram of the input-output management unit of the circuit of FIG. 1.

It should be noted that a switching device 54 is associated with a parallel-series register 20 for activating, as a function of a switching control, whole or a part of the data flip flops of the register, for example 16 or 12 flip flops in the present example. It will be assumed subsequently that register 20 is selected for its low capacity of 12 input channels, since each series connection frame then includes successively the bits: CU, B0, B1, B2, ... B10, B11, BB0, BB1, P47, instead of CU, B0, B1, B2, ... B14, B15, BB0, BB1, P47 for operation with sixteen useful input channels FIG. 3 shows one embodiment of the input-output management unit 25. The series input 24 of unit 25 is connected via a digital common mode filter 60 both to a series input 61 of a deserializing means 62 in this case formed by a series-parallel register and, on the other hand, to a parity checking means 63 delivering for each word transmitted a parity bit PAR reprsentative of a correct or incorrect parity. The same goes for the series input 24a, for which a common mode digital filter 60a is provided as well as a deserializing register and other members identical to those which will now be described in interdependence with register 62.

Preferably, member 63 includes an exclusive OR gate interconnected with a D flip flop in the manner described for means 47. An input of the exclusive OR gate is thus connected to the input 24, another input of this gate is connected to the Q output of the D flip flop; the Q output is further connected to an exchange control logic which will be described further on.

Each digital filter 60, 60a receives clock signals HD1, HD2 from the clock system 26 and serves for eliminating the common mode disturbances affecting the series connection 22, 22a.

Register 62 has parallel outputs B1, B0, D0-D11 and CU. The outputs D0-D11 of register 62 are coupled to an exchange validation register 64 whereas outputs B1, B0 and CU are coupled to an exchange control logic 66.

The outputs of register 64 are coupled to the inputs of a latching register 65. The exchange control logic 66 receives, besides the exchange integrity control bits B0 and B1, the parity control bit PAR and delivers an exchange validation signal VAL when it has checked that the bits B0, B1, PAR of the two series connections 22 and 22a all have the correct value. Logic 66 delivers a reset signal RZ and a fault signal DEF1 if one of the bits B0, B1, PAR keeps an incorrect value for a predetermined number of exchanges, as well as a fault signal DEFO if the bit CU reveals too low a voltage of the sensors.

The signal VAL is couplable to register 64 and, depending on is state, enables or prevents loading of the register. In a case of a fault, register 64 keeps the data of the preceding frame; if the fault persists, it keeps the old data for n frames and it is reset at the n+1th frame (n=3 for example) by means of a counting circuit in logic 66 and described further on with reference to FIG. 4.

The latching register 65 controls 12 lines I0-I11 connected via an 8 output multiplexer 67 to a three state buffer 68 for access to the 8 bit bus 13. Multiplexer 67 similarly receives 12 output lines I12-I23 from a similar latching register not shown and corresponding to the series connection 22a. The multiplexer 67 multiplexes different other signals, particularly high speed input signals ER0, ER1 coming as the case may be from the event inputs 16 and sensor voltage fault DEFO, exchange fault DEF1, output fault DEF2 and voltage fault of the automaton DEF3 signals. A logic 69 also receives the signals ER0, ER1 for generating an interruption signal INT applicable to multiplexer 67.

Figure 4:
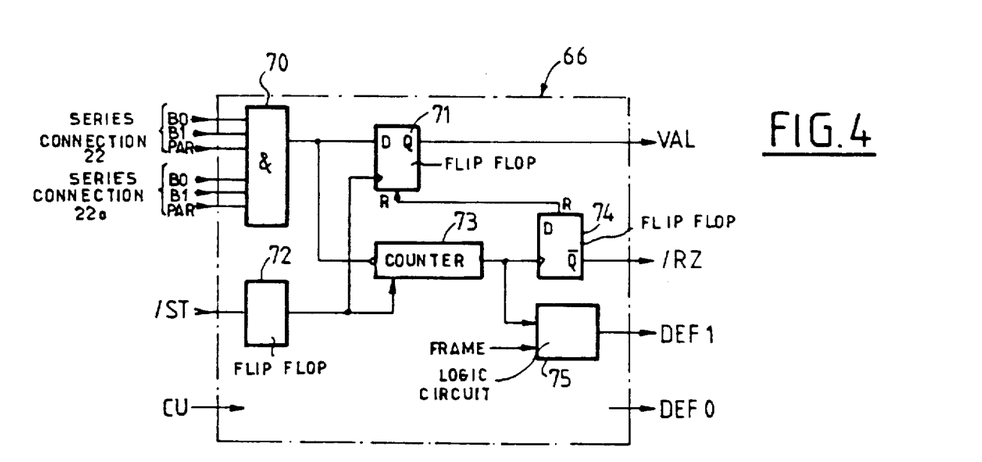
FIG. 4 shows in greater detail a part of the exchange control logic of the input-output management unit of FIG. 3.

As shown in detail in FIG. 4, the exchange control logic 66 incldues an AND logic 70 which receives the bits B0, B1 and PAR corresponding to the series connections 22 and 22a. An output of logic 70 is connected to the inhibiting input of a fault counter 73 and to the data input of a D flip flop 77 whose Q output generates the signal VAL. The clock input of flip flop 71 and the input of the fault counter 73 receive the signal /ST via a flip flop 72 called "first frame".

The first frame flip flop 72 thus makes it possible to disable flip flop 71 and to avoid incrementing counter 73 when the first signal ST arrives; in fact, this latter serves for loading the data into the serializing register 20, (20a); and it is only at the second signal ST that the data in the validation register 64 may be taken into account.

Counter 73 includes an output connected, on the one hand, to the clock input of a D flip flop 74 delivering the signal RZ for resetting the register 64 and, on the other hand, to a logic 75 delivering a fault signal DEF1 when the counter has counted four consecutive exchange errors. The logic 75 generating the signal DEF1 is latchable as well as register 65 by a signal TRAME.

Figure 5:
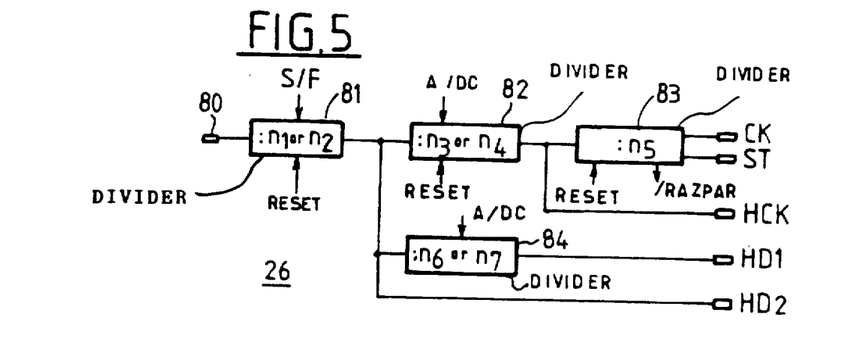
FIG. 5 is a diagram of the clock system for the management unit.

FIG. 5 shows the clock system 26 of the input-output management unit 25. This system has an input terminal 80 connected to a clock properly speaking whose frequency is for example 3.7 to 4 MHz, then three successive frequency dividers 81, 82, 83 and a frequency divider 84 in parallel with 82.

Divider 81 delivers to dividers 82, 84 a signal HD1 divided by n1 or n2>n1 depending on the state of a signal S/F whose state is chosen for example as a function of the disabling characteristics of the optocoupler 23 for slightly slowing down the frame.

Divider 82 generates a signal divided by n3 or n4>n3 depending on the state of a signal A/DC when a much slower transmission is desired, this being possibly the case for AC current inputs. Divider 82 delivers a signal HCK retransmitted to divider 83. This latter generates the discontinuous clock signal CK and the scrutinization signal SC, this latter being obtained by dividing the frequency of HCK by n5. Divider 84 receives a signal HD1 and delivers a signal HD2 divided by n6 or by n7>6, which slows HD2 considerably as a function of the state of the signal A/DC.

Figure 6:
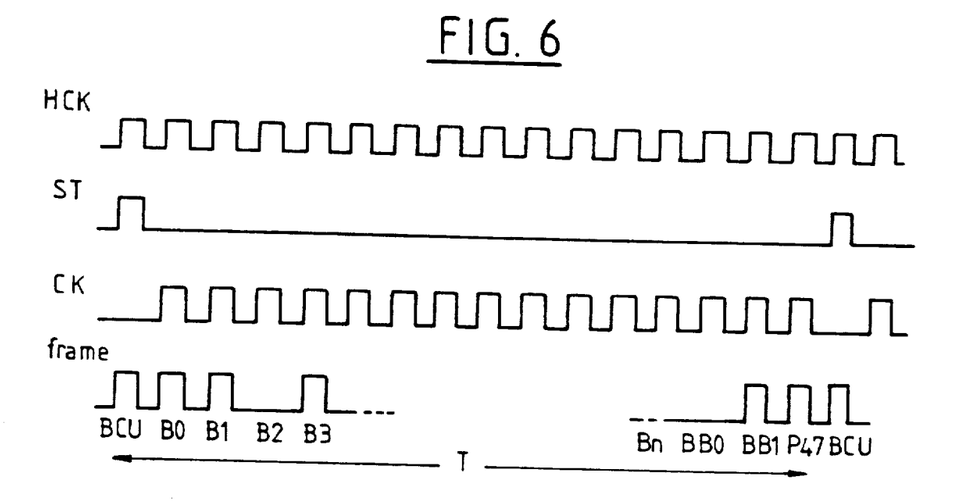
FIG. 6 illustrates by a timing diagram some of the signals generated by the clock system and an example of an input frame timed by these signals.

FIG. 6 shows the timing diagrams of the respective signals HCK, CK and ST as well as the length T of a frame. By way of example, this length may be 2.5 ms for S/F=0 and A/DC=0.

The clock system 26, which it should be emphasized is proper to the management unit 25, times the series connection 22 and serves for managing the multiplexing of the display It also times the series connection 37 from the management unit. HD1 and HD2 serve for timing the digital filters 60, 60a. HCK causes CK and ST to be generated and therefore makes possible the formation of the input and output frames of the management unit 25.

Furthermore, with the input-output management circuit material and software self test arrangement are associated, which have not been shown.

The analog input filters 45 may be replaced by digital filters

Figure 7:
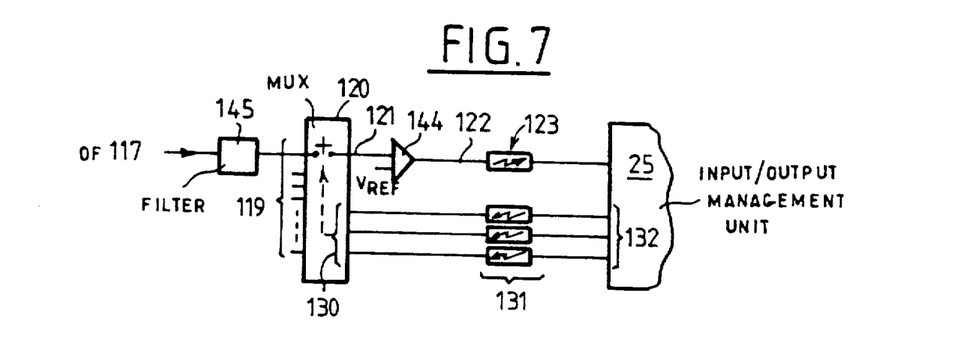
FIG. 7 shows schematically a variant of the serialising means usable in the input-output management circuit of FIG. 1.

In another embodiment shown in FIG. 7 the serializing member is formed by an analog multiplexer 120 controlled by addressing. The multiplexer has inputs 119 connected to the input terminals 117 via filters 145 and a multiplexed output 121 connected via a comparator 144 to which the threshold VREF is applied to a series connection 122 equipped with an optocoupler 123 and connected to the management unit. The multiplexer also has addressing inputs 130 connected by lines each having an optocoupler 131 to respective addressing outputs 132 of the management unit.

What is claimed is:

1. An input management circuit for a programmable controller having a plurality of outputs and comprising a central unit having a processor functioning at a determined processing rate and memories, particularly an input-output image memory, a data bus and a service signal bus providing the connection between the management circuit and the central unit, said management circuit further comprising:
   i) a plurality of parallel input channels connected to respective sensors,
   ii) a serializer having parallel inputs connected to the respective input channels by respective filtering and threshold members, a clock input, a scrutinizing input and a series output which transmits words comprising successive bits corresponding to the signals applied to the input channels,
   iii) a management unit connected to the processor of the central unit through said data bus and said signal service bus for exchanging data with the input-output image memory, said management unit having a series input connected to the series output of the serializer through a series connection comprising a first isolating member, said management unit further comprising a clock system independent from the central unit and having a clock output connected to the said clock input through a second isolating member and a scrutinizing output connected to the said scrutinizing input through a third isolating member, so as to transmit to said serializer clock and scrutinizing signals which time said bits and said words to be conveyed by the serializer to the management unit with a rate which is different from the processing rate of the central unit.

2. The input management circuit as claimed in claim 1, wherein said serializer is a parallel-series register.

3. The input management circuit as claimed in claim 2, further comprising several parallel-series registers each having a series output connected to the management unit through an optocoupler and a clock input connected by a single common clock optocoupler to the management unit.

4. The input management circuit as claimed in claim 2, wherein the parallel-series register has a scrutinization input to which is applied, via a connection with an optocoupler, a cyclic scrutinization signal generated by the clock signal of the management unit.

5. The input management circuit as claimed in claim 4, further comprising several parallel-series registers having series outputs connected to the management unit through respective optocouplers and series scrutinization inputs connected to the management unit through a single scrutinization optocoupler.

6. The input management circuit as claimed in claim 1, wherein the serializer is an analog multiplexer having several addressing inputs connected via respective optocouplers to addressing outputs of the management unit.

7. The input management circuit as claimed in claim 1, wherein:
   i) each word delivered by the serializer comprises one control bit for checking the series connection,
   ii) the serializer comprises means for generating the control bit and affixing it to the word,
   iii) the management unit comprises a deserializing means with series input and at least one output for the control bit, and
   iv) a logic circuit processes the control bit for delivering an exchange validation signal when the value of the control bit received by the deserializing means is correct.

8. The input management circuit as claimed in claim 7, wherein the serializer generates a word including a control bit of value 1, a control bit of value 0, a plurality of data bits and a parity bit for the data bits, wherein:
   i) the said serializer has a means for generating the parity bit and affixing it to the word,
   ii) the deserializing means is provided with respective outputs for the control bits, and
   iii) the logic circuit processes the control bits and a second parity bit calculated from the first parity bit, for delivering the exchange validation signal when the value of the bits is correct.

9. The input management circuit as claimed in claim 8, wherein:
   i) the means for generating the parity bit include an exclusive OR gate whose output is connected to the input of a D flip flop, having a Q output which is connected to the series connection and to a first input of the exclusive OR gate, whereas a second input of this gate is connected to the series output of the serializer,
   ii) the second parity bit is calculated by a means including a second exclusive OR gate having an output connected to an input of a second D flip flop, having a Q output connected to an exchange control logic circuit and to a first input of the second exclusive OR gate, whereas a second input of this second exclusive OR gate is connected to the series input of the deserializing means.

10. The input management circuit as claimed in claim 7, wherein the deserializing means comprises a plurality of parallel outputs and the management unit comprises a parallel confirmation register and a parallel latching register coupled to the data bus, the confirmation register being provided with an input for the validation signal and being loaded by the parallel outputs of the deserializing means and unloaded towards the latching register when said signal assumes its validation value.

11. The input management circuit as claimed in claim 1, wherein a clock signal generator included in the management unit comprises means for generating a clock signal having a frequency which is lowered with a first lowering rate, as a function of a first switching signal applied to the said clock signal generator.

12. The input management circuit as claimed in claim 11, wherein the said generating means comprises means for lowering said clock signal as a function of a second switching signal, with a second lowering rate different from the first lowering rate.

13. The input-output management circuit as claimed in claim 1, wherein said programmable controller has outputs which are controlled by said management unit.

14. An input management circuit for a programmable controller having a plurality of outputs and comprising a central unit including a processor and memories, particularly an input-output image memory, a data-bus and a service signal bus providing the connection between the management circuit and the central unit, said management circuit comprising:
  i) a plurality of parallel input channels connected to respective sensors generating respective voltages which are cyclically scrutinized by the central unit,
  ii) a serializer with parallel inputs connected to the respective input channels by respective filtering and threshold members having a series output which transmits words comprising succesive bits corresponding to signals applied to the input channels,
  iii) a series connection connecting said series output to a management unit connected to the processor of the central unit for exchanging data with the input-output image memory,
  iv) an isolating member interposed in the said series connection for ensuring isolated transmission of input signals between the serializer and the management unit, and
  v) a filter disposed in the said series connection between the isolating member and the management unit,
  wherein:
    vi) the serializer comprises means for generating a control bit for checking the series connection and affixing it to each word delivered by the serializer,
    vii) the management unit comprises a deserializing means with series input, at least one output for the control bit and parallel outputs connected to a parallel confirmation register provided with an input for a validation signal, said confirmation register being connected to a parallel latching register coupled to the data bus and
    viii) a logic circuit processes the control bit for delivering the validation signal when the value of the control bit received by the deserializing means is correct, said logic circuit comprising a fault counter and logic elements for generating the validation signal, an exchange fault signal and a reset signal for resetting the confirmation register and, when the state of said validation signal is significant of an exchange fault, the counter increments until it reaches a predetermined number of faults for which the reset and exchange fault signals are generated.

15. An input management circuit for a programmable controller having a plurality of outputs and comprising a central unit including a processor and memories, particularly an input-output image memory, a data bus and a service signal bus providing the connection between the management circuit and the central unit, said management circuit comprising:
  i) a plurality of parallel input channels connected to respective sensors generating respective voltages which are cyclically scrutinized by the central unit,
  ii) a serializer with parallel inputs connected to the respective input channels by respective filtering and threshold members and having a series output which transmits words comprising successive bits corresponding to signals applied to the input channels,
  iii) a series connection connecting said series output to a management unit connected to the processor of the central unit for exchanging data with the input-output image memory,
  iv) an isolating member interposed in the said series connection for ensuring isolated transmission of input signals between the serializer and the management unit, and
  v) a filter disposed in the said series connection between the isolating member and the management unit,
  wherein:
    vi) the serializer comprises means for generating a control bit for checking the series connection and affixing it to each word delivered by the serializer,
    vii) the management unit comprises a deserializing means with a series input and at least one output for the control bit and parallel outputs connected to a parallel confirmation register provided with an input for a validation signal, said confirmation register being connected to a parallel latching register coupled to the data bus,
    viii) logic circuit processes the control bit for delivering to the confirmation register the validation signal when the value of the control bit received by the deserializing means is correct,
    ix) each word delivered by the serializer comprises a voltage control bit for checking the said voltages,
    x) the serializer has a means for generating the voltage control bit and for fixing it to each word delivered by the serializer,
    xi) the deserializing means is provided with an output for the voltage control bit,
    xii) the logic circuit comprises means for processing the voltage control bit for delivering to the confirmation register a voltage fault signal when one of said voltages is less than a predetermined threshold.

16. The input management circuit as claimed in claim 15, wherein said means for generating the voltage control bit is connected to an input terminal on which is applied the voltage generated by said sensors, through a comparator in series with the filter, the comparator comparing the voltage generated by the sensors with a reference voltage formed by said threshold applied to the filtering and threshold members.

17. The input management circuit as claimed in claim 16, wherein the filtering and threshold members have a first time constant and the filter has:

i) for a cut off of the voltage generated by the sensors, a second time constant less than the first time constant,
ii) for restablishing the voltage generated by the sensors, a third time constant greater than the first time constant,
iii) a series connection connecting said series output to a management unit connected to the processor of the central unit for exchanging data with the input-output image memory,
iv) an isolating member such as an optocoupler interposed in the said series connection for ensuring isolated transmission of input signals between the serializer and the management unit, and
v) a filter disposed in the said series connection between the optocoupler and the management unit, wherein:

vi) the serializer comprises means for generating a control bit for checking the series connection and affixing it to each word delivered by the serializer,
vii) the management unit comprises a deserializing means with series input, at least one output for the control bit and parallel outputs connected to a parallel confirmation register provided with an input for a validation signal, said confirmation register being connected to a parallel latching register coupled to the data bus and
viii)

18. The input management circuit as claimed in claim 7, wherein said filter is a digital filter disposed in the input management unit between the series input thereof and the deserializing means, said filter being timed by at least one clock signal generated by the clock signal of the management unit.

* * * * *